United States Patent
Trika et al.

(10) Patent No.: US 10,437,731 B2
(45) Date of Patent: Oct. 8, 2019

(54) MULTI-LEVEL NON-VOLATILE CACHE WITH SELECTIVE STORE

(71) Applicant: Intel Corporation, Santa Clara, CA (US)

(72) Inventors: Sanjeev N. Trika, Portland, OR (US); Slawomir Putyrski, Gdynia (PL)

(73) Assignee: Intel Corporation, Santa Clara, CA (US)

( * ) Notice: Subject to any disclaimer, the term of this patent is extended or adjusted under 35 U.S.C. 154(b) by 91 days.

(21) Appl. No.: 14/998,070

(22) Filed: Dec. 24, 2015

(65) Prior Publication Data
US 2017/0185523 A1 Jun. 29, 2017

(51) Int. Cl.
| | |
|---|---|
| *G06F 12/00* | (2006.01) |
| *G06F 13/00* | (2006.01) |
| *G06F 13/28* | (2006.01) |
| *G06F 12/0897* | (2016.01) |
| *G06F 3/06* | (2006.01) |
| *G06F 12/0891* | (2016.01) |
| *G06F 12/0871* | (2016.01) |
| *G06F 12/123* | (2016.01) |

(52) U.S. Cl.
CPC ........ *G06F 12/0897* (2013.01); *G06F 3/0611* (2013.01); *G06F 3/0653* (2013.01); *G06F 3/0685* (2013.01); *G06F 12/0871* (2013.01); *G06F 12/0891* (2013.01); *G06F 12/123* (2013.01); *G06F 2212/1016* (2013.01); *G06F 2212/222* (2013.01); *G06F 2212/60* (2013.01)

(58) Field of Classification Search
CPC .... G06F 3/0685; G06F 8/454; G06F 12/0811; G06F 12/0897
USPC ........................................................ 711/118
See application file for complete search history.

(56) References Cited

U.S. PATENT DOCUMENTS

| | | | |
|---|---|---|---|
| 6,321,297 B1 * | 11/2001 | Shamanna | G06F 12/0864 710/52 |
| 7,596,662 B2 | 9/2009 | Makineni et al. | |
| 2002/0129096 A1 * | 9/2002 | Mansour | G06F 9/4443 709/203 |
| 2009/0327584 A1 * | 12/2009 | Tetrick | G06F 12/0866 711/103 |

(Continued)

OTHER PUBLICATIONS

Michael Mesnier, Feng Chen, Tian Luo, Jason B. Akers, Differentiated storage services, Oct. 23-26, 2011, Proceedings of the Twenty-Third ACM Symposium on Operating Systems Principles.*

(Continued)

*Primary Examiner* — Edward J Dudek, Jr.
*Assistant Examiner* — Sidney Li
(74) *Attorney, Agent, or Firm* — Schwabe, Williamson & Wyatt, P.C.

(57) ABSTRACT

In embodiments, apparatuses, methods and storage media associated with a multi-level cache are described. A first storage level may receive an input/output (I/O) request from a second storage level of the multi-level cache, wherein the I/O request is associated with a data. The first storage level may further receive an indicator to indicate whether the data is stored or will be stored in the second storage level. The first storage level may determine whether to store the data in the first storage level based on the indicator. Other embodiments may be described and/or claimed.

22 Claims, 5 Drawing Sheets

(56) References Cited

U.S. PATENT DOCUMENTS

| | | | |
|---|---|---|---|
| 2011/0010502 A1* | 1/2011 | Wang | G06F 12/121 |
| | | | 711/128 |
| 2012/0159081 A1 | 6/2012 | Agrawal et al. | |
| 2013/0268728 A1 | 10/2013 | Ramanujan et al. | |
| 2014/0297961 A1 | 10/2014 | Thollethodi et al. | |
| 2015/0095598 A1* | 4/2015 | Abou Gazala | G06F 9/46 |
| | | | 711/162 |
| 2015/0347299 A1 | 12/2015 | Hagersten et al. | |

OTHER PUBLICATIONS

Black, C., et al., "Solid-State Drive Caching with Differentiated Storage Services," IT@Intel White Paper, IT Best Practices, Storage and Solid-State Drives, Jul. 2012, <<www.intel.com/IT>> 8 pages.
Wong, T., M., et al., "My cache or yours? Making storage more exclusive," USENIX Annual Technical Conference (USENIX 2002), pp. 161-175, Jun. 10-15, 2002, Monterey, CA (USENIX, Berkeley, CA), 15 pages.
International Search report and Written Opinion dated Mar. 6, 2017, issued in corresponding International Application No. PCT/US2016/062360, 16 pages.

\* cited by examiner

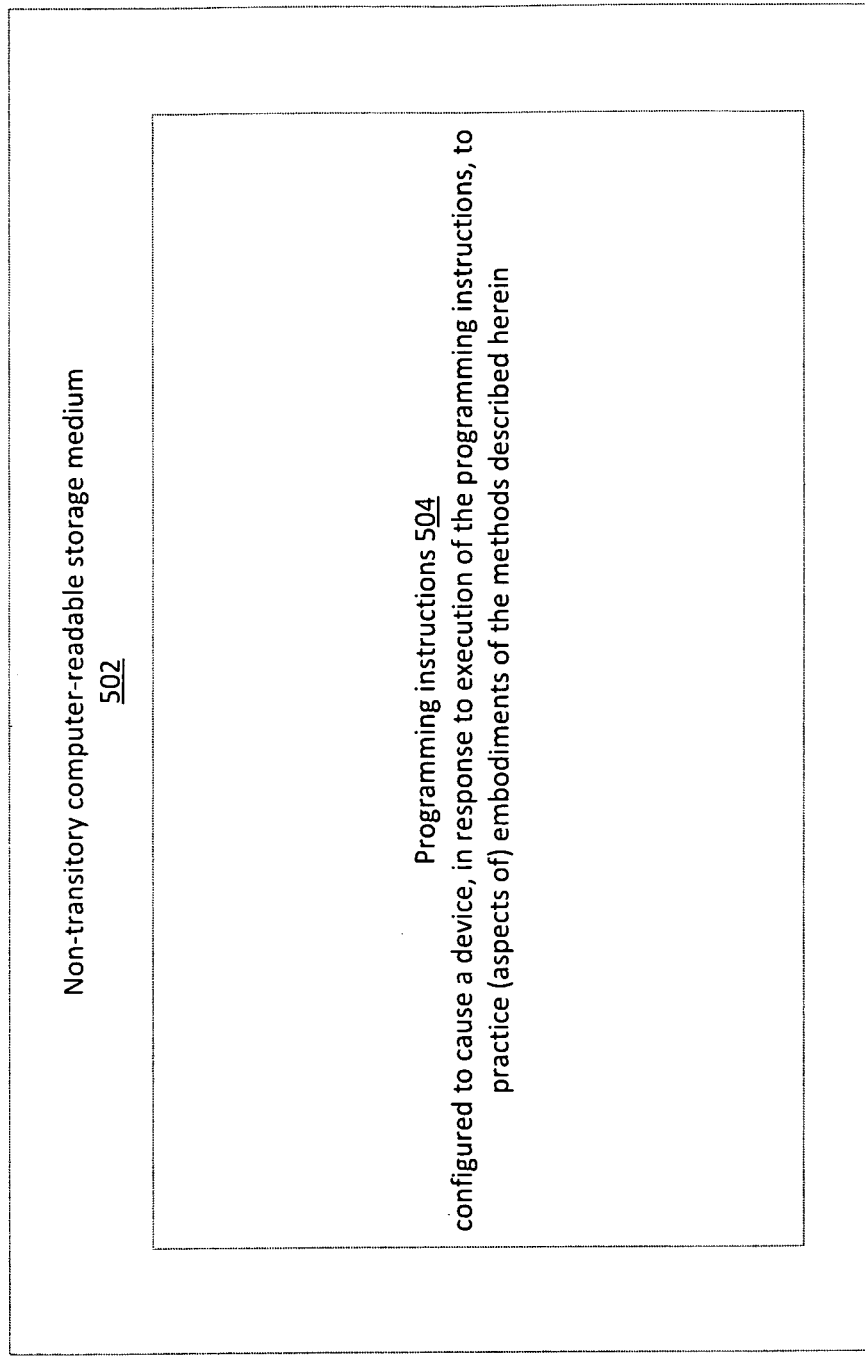

MULTI-LEVEL NON-VOLATILE CACHE WITH SELECTIVE STORE

TECHNICAL FIELD

The present disclosure relates to the field of electronic memory and, in particular, to a multi-level non-volatile cache with selective store that may increase effective cache storage capacity in the multi-level non-volatile cache.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

A fast access memory (for example, cache) is often used to store selected data of a storage volume to allow the selected data to be accessed more quickly than data from a memory (storage device) having a slower access time (e.g., hard disk drive (HDD)). Some systems include a multi-level cache with multiple tiers of cache media. Data stored in the fast access memory is replicated in the slow access memory/storage device.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

FIG. 5 illustrates an example storage medium with instructions configured to enable an apparatus to practice various aspects of the present disclosure, in accordance with various embodiments.

DETAILED DESCRIPTION

Figure 1:
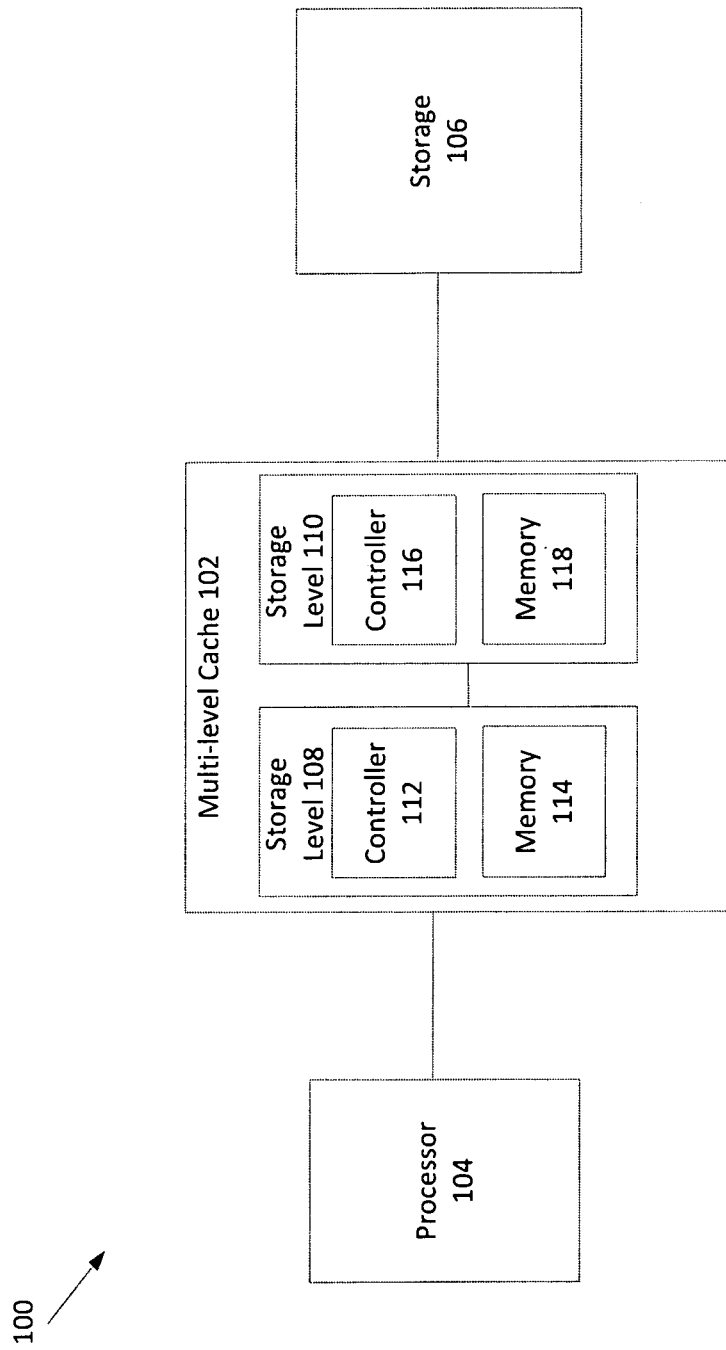
FIG. 1 is a block diagram of a computing system including a multi-level cache of the present disclosure, in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. The term "module" may refer to software, firmware and/or circuitry that is/are configured to perform or cause the performance of one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, software and/or firmware that stores instructions executed by programmable circuitry. The modules may collectively or individually be embodied as circuitry that forms a part of a computing device. As used herein, the term "processor" may be a processor core.

In embodiments, apparatuses, methods and storage media associated with a multi-level cache are described. A first storage level may receive an input/output (I/O) request (e.g., read request or write request) from a second storage level of the multi-level cache, wherein the I/O request is associated with a data. The first storage level may further receive an indicator to indicate whether the data is stored or will be stored in the second storage level. The first storage level may determine whether to store the data in the first storage level based on the indicator.

Referring now to FIG. 1, a computing system 100 having a multi-level cache 102 incorporated with the selective store technology of the present disclosure, in accordance with various embodiments, is illustrated. The computing system 100 may further include a processor 104 and a storage 106 coupled to the multi-level cache 102. The multi-level cache 102 may include a storage level 108 and a second storage level 110 coupled to one another. The storage level 108 may include a controller 112 and a memory 114, and the storage level 110 may include a controller 116 and a memory 118. The multi-level cache 102 may also be referred to as a multi-layer cache. For the purpose of this application, the two terms may be considered as synonymous. Further, the storage level 108 may be referred to as an upper storage level or higher storage level, and the storage level 110 may be referred to as a lower storage level. In embodiments, the controller 112 and the controller 116 are incorporated with complementary logic to practice selective store to potentially increase the effective capacity of the multi-level cache 102, to be more fully described below.

In various embodiments, the memory 114, memory 118, and storage 106 may be non-volatile memory. In some embodiments, the memory 114 of the storage level 108 may be a different memory technology than the memory 118 of the storage level 110. For example, in some embodiments, the memory 114 may be a faster, but more expensive, memory technology than the memory 118. Additionally, the storage 108 may include a different memory technology than the memory 114 and/or memory 118. In one non-limiting embodiment, the memory 114 may be byte addressable three-dimensional (3D) cross-point memory and the memory 118 may be a Solid State Drive (SSD) that includes NAND flash memory or 3D cross-point memory. In some embodiments, the storage 106 may include a hard disk drive (HDD). In some embodiments, the memory 114, memory 118, and/or storage 108 may include Multi Level Cell (MLC) NAND flash memory, ferroelectric random-access memory (FeTRAM), nanowire-based non-volatile memory, three-dimensional (3D) cross-point memory such as phase change memory (PCM), memory that incorporates memristor technology, Magnetoresistive random-access memory (MRAM), Spin Transfer Torque (STT)-MRAM, single level cell (SLC) Flash memory and/or other electrically erasable programmable read only memory (EEPROM) type devices.

In various embodiments, the multi-level cache 102, including the storage level 108 and storage level 110 may be included in a same computing device as the processor 104 and controlled by a same operating system. In some embodiments, one or more of the storage levels 108 and/or 110 of the multi-level cache 102 may be included on a same integrated circuit (IC) and/or IC package as the processor 104. Additionally, or alternatively, one or more of the storage levels 108 and/or 110 may be disposed on a separate IC or IC package from the processor 104. In various embodiments, the storage 106 may include storage in the same computing device as the processor and multi-level cache 102. Additionally, or alternatively, the storage 106 may include a network-attached storage (e.g., cloud storage) that is accessible via a network interface.

In various embodiments, the multi-level cache 102 may serve as a cache for the storage 106 to cache a storage volume data associated with the storage 106. For example, the multi-level cache 102 may store some of the data stored by the storage 106 to enable the processor 104 to access the data more quickly than would be possible from the storage 106. In some embodiments, data stored by the multi-level cache 102 may be replicated by the storage 106.

In various embodiments, with the storage level 108 being the higher storage level of the multi-level cache 102 and the storage level 110 being the lower storage level, during a read operation to retrieve data for the processor 104, the data may first be requested from the storage level 108. If the data is not available from storage level 108, the data may be requested from the storage level 110. If the data is not available from any of the storage levels of the multi-level cache 102, then the data may be requested from the storage 106. In some embodiments, the multi-level cache 102 may include one or more additional storage levels at a storage level above the storage level 108, below the storage level 110, and/or between the storage levels 108 and 110. A higher storage level may be considered to be at a higher level than a lower storage level if data is first requested to be read from the higher storage level and, if the data is not available in the higher storage level, the data is then requested to be read from the lower storage level. Accordingly, the higher storage level may generally store data with higher priority than data stored in the lower storage level.

For a write operation, data may be written to storage level 108, storage level 110, and/or storage 106 according to a cache policy of the multi-level cache 102. The cache policy may determine whether to store the data in storage level 108 and/or storage level 110 using one or more rules based on one or more parameters, such as a priority level of the data. In some embodiments, one or more parameters associated with the data (e.g., metadata such as the priority level of the data) may be included in differentiated storage services (DSS) information that is passed from the processor 104 to the multi-level cache 102 and/or between storage levels of the multi-level cache 102 (e.g., between the storage level 108 and the storage level 110). The DSS information may be included in and/or otherwise associated with an I/O request (e.g., a read request or a write request) that is received by the multi-level cache 102 from the processor 104.

In various embodiments, the controller 112 of storage level 108 may pass an indicator to the controller 116 of storage level 110 to indicate whether data associated with an I/O request (e.g., a read operation or a write operation) is stored or will be stored by the storage level 108 (or a storage level above the storage level 108 if one is present). If the indicator indicates that the data is stored or will be stored by the storage level 108 (e.g., in the memory 114), the storage level 110 may not store the data in the memory 118 and/or may evict the data from the memory 118 if the data is already stored in the memory 118. Accordingly, the storage level 110 may not replicate data that is stored by the storage level 108, thereby allowing the multi-level cache 102 to effectively store more data than in a multi-level cache in which data is replicated across storage levels.

In some embodiments, the indicator may be included in the DSS information that is passed from the storage level 108 to the storage level 110. The indicator may alternatively or additionally be passed in a sideband channel between the storage level 108 and storage level 110. The sideband channel may be used for the controller 112 of storage level 108 (e.g., 3D cross-point memory) to communicate with the controller 116 of storage level 110 (e.g., SSD). In some embodiments, the indicator may be a bit having a first value (e.g., logic 1) to indicate that the data is stored or will be stored in a higher storage level (e.g., storage level 108) than the storage level receiving the indicator (e.g., storage level 110), or a second value (e.g., logic 0) to indicate that the data is not stored and will not be stored in a higher storage level than the storage level receiving the indicator.

In various embodiments, the I/O request sent from the processor 104 to the storage level 108 may include the indicator with the second value. The controller 112 may determine whether to store the data associated with the I/O request (e.g., based on the cache policy). If the I/O request is passed from the storage level 108 to the storage level 110 and the controller 112 determines that the data is stored or will be stored in the storage level 108, then the controller 112 passes the indicator to the storage level 110 with the first value. If the I/O request is passed from the storage level 108 to the storage level 110 and the controller 112 determines that the data is not stored and will not be stored in the storage level 108, then the controller 112 passes the indicator to the storage level 110 with the second value.

Figure 2:
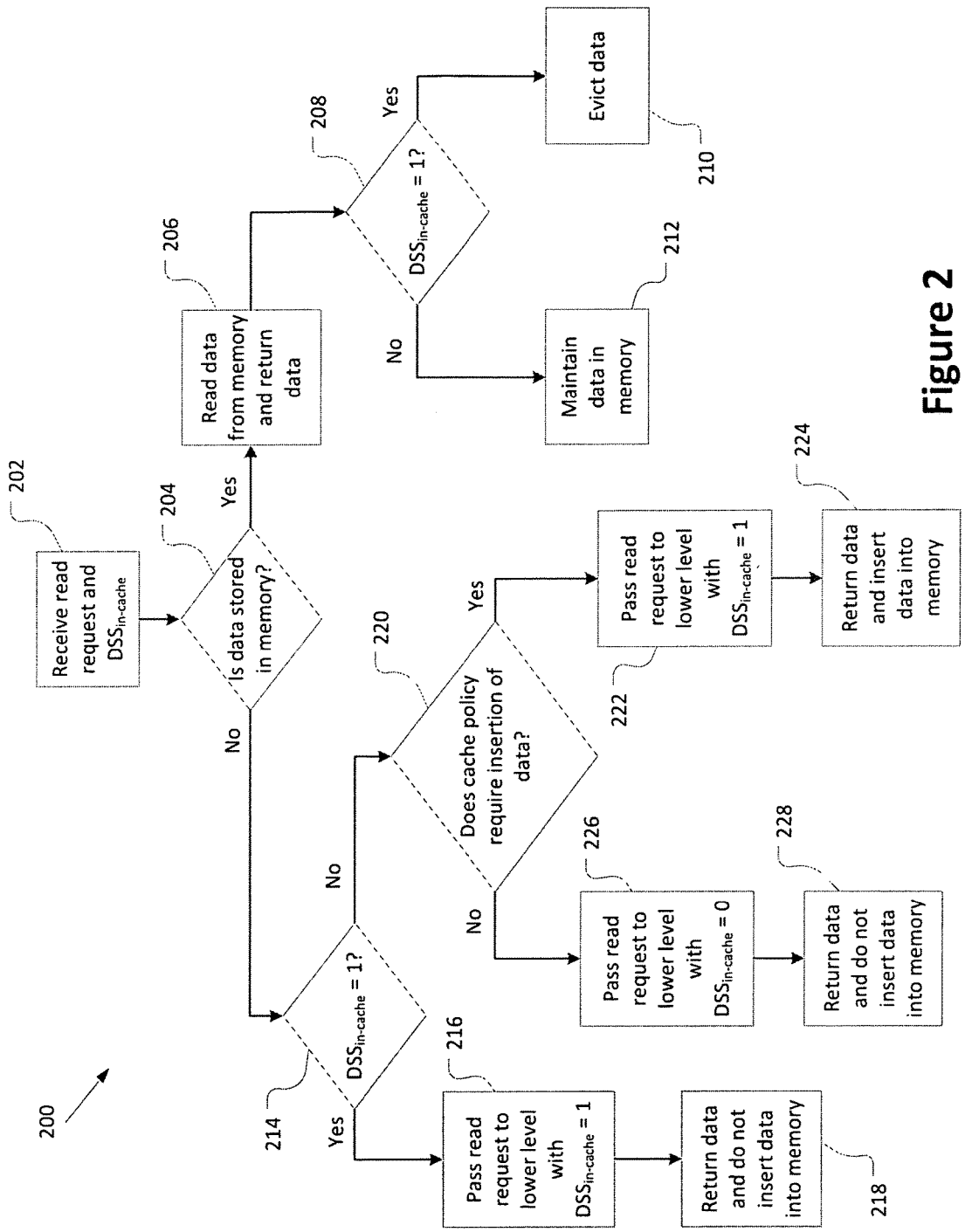
FIG. 2 is a flow chart illustrating a read process to be performed by a multi-level cache, in accordance with various embodiments.

FIG. 2 illustrates a read process 200 ("process 200") that may be performed by a storage level (e.g., the storage level 108 and/or 110) of a multi-level cache (e.g., multi-level cache 102) in accordance with various embodiments. In some embodiments, one or more operations of the process 200 may be performed by the controller of the cache (e.g., controller 112 and/or 116). Although the process 200 is described with reference to a multi-level cache that includes 2 storage levels, it will be apparent that the process 200 may be extended to embodiments in which the multi-level cache includes more than 2 storage levels.

At 202 of the process 200, the storage level 108/110 may receive a read request and an indicator $DSS_{in\text{-}cache}$ associated with a data. The read request may be received from the processor 104 via a memory bus (e.g., in the case of the storage level 108) or from the controller 112 of the storage level 108 (in the case of the storage level 110). In some embodiments, the indicator $DSS_{in\text{-}cache}$ may be included in the read request (e.g., in DSS information associated with the data). The read request may additionally or alternatively indicate a logical block addressing (LBA) range associated with the data. The indicator $DSS_{in\text{-}cache}$ may indicate to a lower storage level (e.g., the storage level 110) whether the data will be stored in a higher storage level (such as storage level 108, after the data is read by the storage level 110, a lower storage level, or the storage device 106 in accordance with the process 200). For example, the indicator $DSS_{in\text{-}cache}$ received by the lower storage level 110 may have a bit with a value of logic 1 to indicate to the storage level 110 that the data will be stored by the higher storage level 108 or a value of logic 0 to indicate that the data will not be stored by the higher storage level 108.

In various embodiments, the processor 104 may include the indicator $DSS_{in\text{-}cache}$ in the read request that the processor 104 sends to the multi-level cache 102 via the memory bus. The indicator may have an initial value of logic 0 when sent from the processor 104. The higher storage level 108 may determine the value of the indicator $DSS_{in\text{-}cache}$ to be passed to the lower storage level 110 based on whether the data will be stored in the higher storage level 108, as further discussed herein.

At 204 of the process 200, the storage level 108/110 may determine whether the data is stored in the storage level 108/110. If the data is stored in the storage level 108/110, the storage level 108/110 may, at 206 of the process 200, read the data from the storage level 108/110 (e.g., retrieve the data from the memory 114/118 and return the data to the processor 104 (optionally via storage level 108, in the case of storage level 110). In some embodiments, the storage level 108/110 may update one or more parameters associated with the data, such as age and/or least recently used (LRU) information.

In addition to performing the read operation at 206, a lower storage level, such as the lower storage level 110, may determine, at 208 of the process 200, whether the indicator $DSS_{in\text{-}cache}$ has a value of logic 1 or logic 0. If the indicator $DSS_{in\text{-}cache}$ has a value of logic 1 (indicating that an upper storage level has stored or will store the data), then the lower storage level 110 may, at 210 of the process 200, evict the data from the memory 118 of the lower storage level 110. If the indicator $DSS_{in\text{-}cache}$ has a value of logic 0 (indicating that an upper storage level will not store the data), then the lower storage level 110 may, at 212 of the process 200, maintain the data in the memory 118.

In some embodiments, the upper storage level (e.g., storage level 108) may perform the operations at 208, 210, and/or 212 of process 200. However, as discussed above, the value of the indicator $DSS_{in\text{-}cache}$ that is received by the upper storage level 108 from the processor 104 will typically be defaulted to logic 0. Accordingly, the upper storage level 108 will typically perform operation 212 and may or may not perform the determination at 208.

If, at 204 of the process 200, the storage level 108/110 determines that the data is not stored in the storage level 108/110, then, at 214 of the process 200, the storage level 108/110 may determine whether the indicator $DSS_{in\text{-}cache}$ has a value of logic 1 (indicating that an upper storage level will store the data) or logic 0 (indicating that an upper storage level will not store the data). In embodiments, in the case of the upper storage level 108, the indicator $DSS_{in\text{-}cache}$ may always have a value of logic 0 as discussed above. In some embodiments, the storage level 108/110 may, at 216, pass a read request to the lower storage level (e.g., to second storage level 110 from storage level 108) and/or storage device 106 with $DSS_{in\text{-}cache}$ set to a logic 1 to indicate that the storage level 108 or 110 will store the data. At 218 of the process 200, the storage level 108/110 may return the data and may not insert the data into the memory 114/118 of the storage level 108/110.

If the indicator $DSS_{in\text{-}cache}$ has a value of logic 0 (indicating that an upper storage level will not store the data), then the storage level 108/110 may, at 220 of the process 200, determine whether the cache policy requires that the data be stored in the storage level 108/110. If the cache policy indicates that the data should be stored in the storage level 108/110, the controller 112/116 may, at 222 of the process 200, pass a read request to the lower storage level (e.g., to second storage level 110 from storage level 108) and/or storage device 106 with $DSS_{in\text{-}cache}$ set to a logic 1 to indicate that the storage level 108/110 will store the data. At 224 of the process 200, the storage level 108/110 may return the data received from the lower storage level and insert the data into the memory 114/118 of the storage level 108/110.

If the cache policy indicates that the data should not be stored in the storage level 108/110, the storage level 108/110 may, at 226 of the process 200, pass a read request to the lower storage level (e.g., to second storage level 110 from storage level 108) and/or storage device 106 with $DSS_{in\text{-}cache}$ set to a logic 0 to indicate that the data will not be stored in the storage level 108 or 110. At 228 of the process 200, the storage level 108/110 may return the data received from the lower storage level and may not insert the data into the memory 114/118 of the storage level 108/110.

Various operations of the process 200 are described as multiple discrete operations, in a manner that is most helpful in understanding the claimed subject matter. However, the order of description should not be construed as to imply that these operations are necessarily order dependent. It will be appreciated that the sequence of operations associated with the process 200 may vary and/or include other actions in accordance with the present disclosure. For example, some operations may be performed at the same time.

Figure 3:
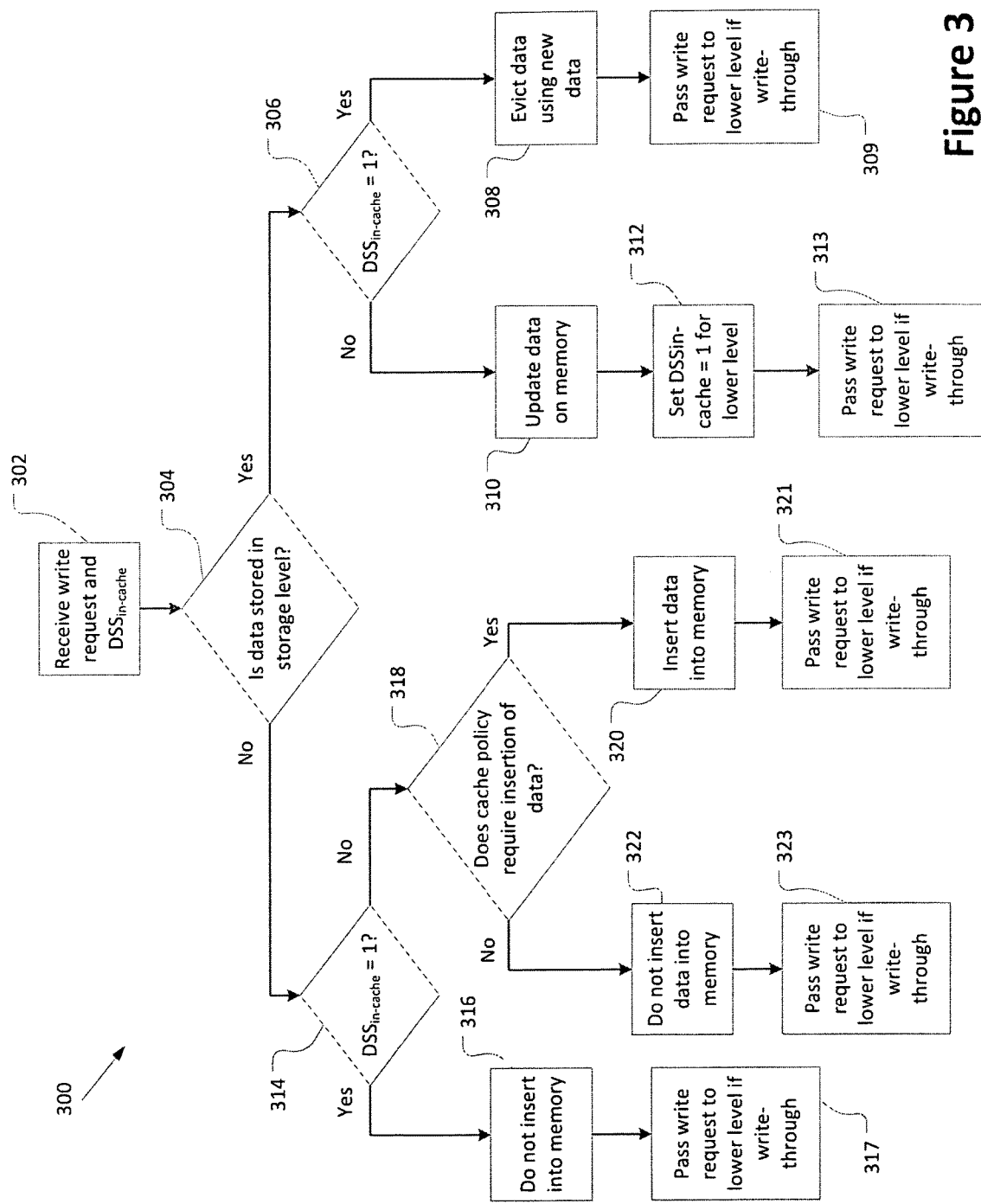
FIG. 3 is a flow chart illustrating a write process to be performed by a multi-level cache, in accordance with various embodiments.

FIG. 3 illustrates a write process 300 ("process 300") that may be performed by a storage level of a multi-level cache (e.g., the storage level 108 and/or storage level 110 of multi-level cache 102) in accordance with various embodiments. In some embodiments, one or more operations of the process 300 may be performed by the controller of the storage level (e.g., controller 112 and/or 116). Although the process 300 is described with reference to a multi-level cache that includes 2 storage levels, it will be apparent that the process 300 may be extended to embodiments in which the multi-level cache includes more than 2 storage levels.

At 302 of the process 300, the storage level 108/110 may receive a write request and an indicator $DSS_{in-cache}$ associated with a data. The write request may be received from the processor 102 (e.g., in the case of upper storage level 108) or from an upper storage level (e.g., the upper storage level 108 in the case of lower storage level 110). In some embodiments, the indicator $DSS_{in-cache}$ may be included in the write request (e.g., in DSS information associated with the data). The write request may additionally or alternatively include the data and/or an indicator of an LBA range associated with the data. The indicator $DSS_{in-cache}$ may indicate to a lower storage level (e.g., storage level 110) whether the data is stored in a higher storage level (e.g., storage level 108). For example, the indicator $DSS_{in-cache}$ may be a bit with a value of logic 1 to indicate that the data is stored by the higher storage level 108 or a value of 0 to indicate that the data is not stored by the higher storage level 108.

In various embodiments, the processor 104 may send the indicator $DSS_{in-cache}$ to the higher storage level 108 (e.g., in the write request) with a value of logic 0, and the higher storage level 108 may determine the value of the indicator $DSS_{in-cache}$ to be passed to the lower storage level 110 based on whether the data is to be stored in the higher storage level 108, as further discussed herein.

At 304 of the process 300, the storage level 108/110 may determine whether the data (e.g., an older version of the data that is to be overwritten by the write operation) is stored in the storage level 108/110. If the data is stored in the storage level 108/110, the storage level 108/110 may determine, at 306 of the process 300, whether the indicator $DSS_{in-cache}$ has a value of logic 1 or logic 0. If the indicator $DSS_{in-cache}$ has a value of logic 1, then the storage level 108/110 may, at 308 of the process 300, evict the old data from the memory 114/118 of the storage level 108/110. In some embodiments, the old data may be evicted by overwriting the data with new data. The storage level 108/110 may, at 309 of the process 300, pass the write request to the lower level (e.g., a lower storage level of the multi-level cache or the storage 106) if write-through is enabled. The write request may include the indicator $DSS_{in-cache}$.

If the indicator $DSS_{in-cache}$ has a value of logic 0, then the storage level 108/110 may, at 310 of the process 300, update the data in the memory 114/118. In some embodiments, the storage level 108/110 may, at 312 of the process 300, set the indicator $DSS_{in-cache}$ to logic 1 to indicate to a lower storage level 110 that the data is stored in the upper storage level 108 or to indicate to the storage 106 that the data is stored in one of the upper storage level 108 or lower storage level 110. The storage level 108/110 may, at 313 of the process 300, pass the write request to the lower level (e.g., a lower storage level of the multi-level cache or the storage 106) if write-through is enabled. The write request may include the indicator $DSS_{in-cache}$.

As discussed above, the value of the indicator $DSS_{in-cache}$ that is received by the upper storage level 108 from the processor 104 will typically be defaulted to logic 0. Accordingly, the upper storage level 108 will perform operations 310 and 312 and may or may not perform the determination at 306.

If, at 304 of the process 300, the storage level 108/110 determines that the data is not stored in the storage level 108/110, then, at 314 of the process 300, the storage level 108/110 may determine whether the indicator $DSS_{in-cache}$ has a value of logic 1 or logic 0. If the indicator $DSS_{in-cache}$ has a value of logic 1, then the storage level 108/110 may, at 316 of the process 300, determine not to store the data in the storage level 108/110. The storage level 108/110 may, at 317 of the process 300, pass the write request to the lower level (e.g., a lower storage level of the multi-level cache or the storage 106) if write-through is enabled. The write request may include the indicator $DSS_{in-cache}$.

If the indicator $DSS_{in-cache}$ has a value of logic 0, then the storage level 108/110 may, at 318 of the process 300, determine whether the cache policy requires that the data be stored in the storage level 108/110. If the cache policy indicates that the data should be stored in the storage level 108/110, the controller 112/116 may, at 320 of the process 300, insert the data into the memory 114/118. In some embodiments, the storage level 108/110 may set the indicator $DSS_{in-cache}$ to logic 1 to indicate to a lower storage level 110 that the data is stored in the upper storage level 108 or to indicate to the storage 106 that the data is stored in one of the upper storage level 108 or lower storage level 110. The storage level 108/110 may, at 321 of the process 300, pass the write request to the lower level (e.g., a lower storage level of the multi-level cache or the storage 106) if write-through is enabled. The write request may include the indicator $DSS_{in-cache}$.

In some embodiments, for an eviction without overwrite, the lower storage level 110 may set the indicator $DSS_{in-cache}$ to a logic 0 for the write request that is passed to the storage device 106.

If the cache policy indicates that the data should not be stored in the storage level 108/110, the storage level 108/110 may, at 322 of the process 300, determine not to store the data in the storage level 108/110. In some embodiments, the storage level 108 may set the value of the indicator $DSS_{in-cache}$ that is passed to the lower storage level 110 to a logic 0 to indicate that the data is not stored in storage level 108 and/or the storage level 110 may set the value of the indicator $DSS_{in-cache}$ that is passed to the storage 106 to a logic 0 to indicate that the data is not stored in the storage level 110 or the storage level 108. The storage level 108/110 may, at 323 of the process 300, pass the write request to the lower level (e.g., a lower storage level of the multi-level cache or the storage 106) if write-through is enabled. The write request may include the indicator $DSS_{in-cache}$.

Various operations of the process 300 are described as multiple discrete operations, in a manner that is most helpful in understanding the claimed subject matter. However, the order of description should not be construed as to imply that these operations are necessarily order dependent. It will be appreciated that the sequence of operations associated with the process 300 may vary and/or include other actions in accordance with the present disclosure. For example, some operations may be performed at the same time.

Figure 4:
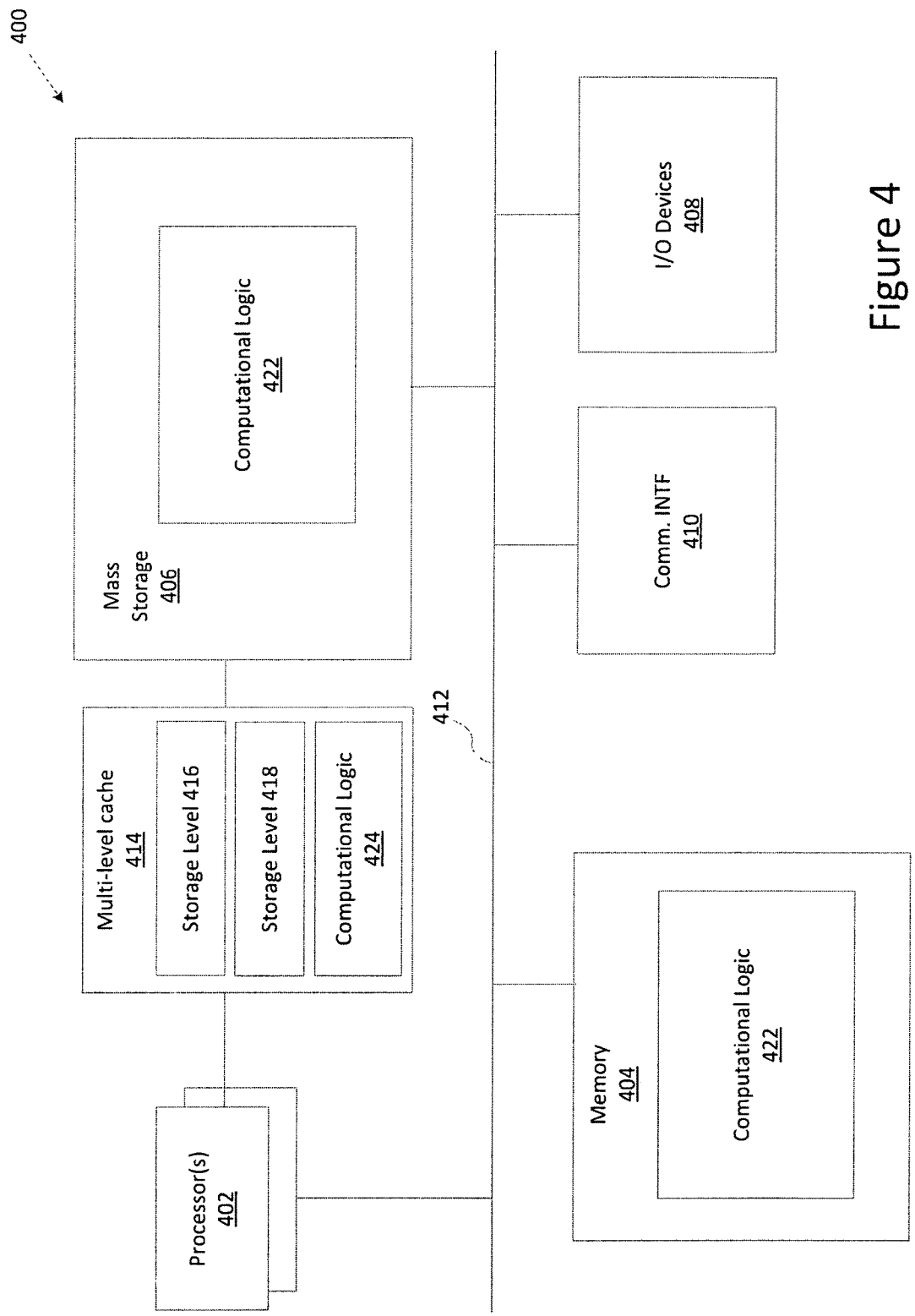
FIG. 4 illustrates an example computing device suitable for practicing various aspects of the disclosure, in accordance with various embodiments.

Referring now to FIG. 4, an example computing device 400 suitable to practice the present disclosure as earlier described with reference to FIGS. 1-3 is illustrated in accordance with various embodiments. As shown, computing device 400 may include one or more processors or processor cores 402, and system memory 404. In some embodiments, the one or more processors or processor cores 402 may include the processor 104 of FIG. 1. For the purpose of this application, including the claims, the term "processor" refers to a physical processor, and the terms "processor" and "processor cores" may be considered synonymous, unless the context clearly requires otherwise. The one or more processors 402 may include a central processing unit (CPU) and/or a graphics processing unit (GPU).

Additionally, computing device 400 may include one or more mass storage devices 406 (such as diskette, hard drive, SSD, compact disc read only memory (CD-ROM) and so forth), input/output devices 408 (such as display, keyboard, cursor control, remote control, gaming controller, image capture device, and so forth), and communication interfaces 410 (such as network interface cards, modems, infrared receivers, radio receivers (e.g., Bluetooth), and so forth). The mass storage devices 406 may include the storage 106 of FIG. 1, in some embodiments. The elements may be coupled to each other via system bus 412, which may represent one or more buses. In the case of multiple buses, they may be bridged by one or more bus bridges (not shown).

In various embodiments, the computing device 400 may further include a multi-level cache 414 that includes a storage level 416 and a storage level 418. The multi-level cache 414 may correspond to the multi-level cache 102 of FIG. 1 and/or the multi-level cache described with respect to FIG. 2 and/or FIG. 3. The storage level 416 may correspond to the storage level 108 of FIG. 1, and/or the storage level 418 may correspond to the storage level 110 of FIG. 1. The multi-level cache 414 may be coupled between the one or more processors 402 and the mass storage 406 to cache a data volume associated with the mass storage 406. In some embodiments, storage level 416 and/or storage level 418 of the multi-level cache 414 may be included within an integrated circuit (IC) and/or IC package that includes memory 404, processor 402, and/or mass storage 406.

The communication interfaces 410 may include one or more communications chips that may enable wired and/or wireless communications for the transfer of data to and from the computing device 400. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication interfaces 410 may implement any of a number of wireless standards or protocols, including but not limited to IEEE 702.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The communication interfaces 410 may include a plurality of communication chips. For instance, a first communication chip may be dedicated to shorter range wireless communications such as Wi-Fi and Bluetooth, and a second communication chip may be dedicated to longer range wireless communications such as GPS, EDGE, GPRS, CDMA, WiMAX, LTE, Ev-DO, and others. In various embodiments, the communication interfaces 410 may be configured to communicate using one or more wireless communication methods and topologies such as IEEE 802.11x (WiFi), Bluetooth, IEEE 802.15.4, wireless mesh networking, wireless personal/local/metropolitan area network technologies, or wireless cellular communication using a radio access network that may include a Global System for Mobile Communication (GSM), General Packet Radio Service (GPRS), Universal Mobile Telecommunications System (UMTS), High Speed Packet Access (HSPA), Evolved HSPA (E-HSPA), Long-Term Evolution (LTE) network, GSM Enhanced Data rates for GSM Evolution (EDGE) Radio Access Network (GERAN), Universal Terrestrial Radio Access Network (UTRAN), Evolved UTRAN (E-UTRAN), IEEE 802.22, IEEE 802.11af, IEEE 802.11ac, LoRa™, or SigFox.

In various embodiments, system memory 404 and mass storage devices 406 may be employed to store a working copy and a permanent copy of the programming instructions implementing an operating system and one or more applications, collectively denoted as computational logic 422. Similarly, multi-level cache 414 may include programming instructions implementing the operations associated with the multi-level cache, e.g., the read process 200 and/or write process 300, collectively denoted as computational logic 424. The system memory 404 and mass storage devices 406 may also be employed to store the data or local resources in various embodiments. The various programming instructions may be implemented by assembler instructions supported by processor(s) 402 or high-level languages, such as, for example, C, that can be compiled into such instructions.

The permanent copy of the programming instructions may be placed into mass storage devices 406 and/or multi-level cache 414 in the factory, or in the field, through, for example, a distribution medium (not shown), such as a compact disc (CD), or through communication interface 410 (from a distribution server (not shown)). That is, one or more distribution media having an implementation of the agent program may be employed to distribute the agent and program various computing devices.

The number, capability and/or capacity of the elements 402, 404, 406, 408, 410, 412, 414, 416, 418, 422, and/or 424 may vary, depending on whether computing device 400 is a stationary computing device, such as a server, high performance computing node, set-top box or desktop computer, a mobile computing device such as a tablet computing device, laptop computer or smartphone, or an embedded computing device. Their constitutions are otherwise known, and accordingly will not be further described. In various embodiments, different elements or a subset of the elements shown in FIG. 4 may be used. For example, some devices may not include the graphics processor 405, may use a unified memory that serves as both memory and storage, or may include one or more multi-level caches 414 within other components such as the processor 402, the memory 404, or the mass storage 406.

FIG. 5 illustrates an example of at least one non-transitory computer-readable storage medium 502 having instructions configured to practice all or selected ones of the operations associated with the multi-level cache 102, read process 300, write process 400, and/or multi-level cache 414 described herein, in accordance with various embodiments. As illustrated, at least one computer-readable storage medium 502 may include a number of programming instructions 504. The storage medium 502 may represent a broad range of persistent storage medium known in the art, including but not limited to flash memory, dynamic random access memory, static random access memory, an optical disk, a magnetic disk, etc. Programming instructions 504 may be configured to enable a device, e.g., computing device 400 (in particular, multi-level cache 414), computing system 100, or multi-level cache 102, in response to execution of the programming instructions 504, to perform, e.g., but not limited to, various operations described for computing system 100 or multi-level cache 102, or operations shown in the process 200 or process 300. In alternate embodiments, programming instructions 504 may be disposed on multiple computer-readable storage media 502. In alternate embodiments, storage medium 502 may be transitory, e.g., signals encoded with programming instructions 504.

Referring back to FIG. 4, for an embodiment, at least one of processors 402 may be packaged together with memory having computational logic 424 configured to practice aspects described for computing system 100, multi-level cache 102, or operations shown in the process 200 or process 300. For an embodiment, at least one of processors 402 may be packaged together with memory having computational logic 424 configured to practice aspects described for computing system 100 or multi-level cache 102, or operations shown in the process 200 or process 300, to form a System in Package (SiP). For an embodiment, at least one of processors 402 may be integrated on the same die with memory having computational logic 424 configured to practice aspects described for computing system 100 or multi-level cache 102, and/or operations shown in the process 200 or process 300. For an embodiment, at least one of processors 402 may be packaged together with memory having computational logic 924 configured to practice aspects of computing system 100 or multi-level cache 102, and/or operations shown in the process 200 or process 300 to form a System on Chip (SoC). For at least one embodiment, the SoC may be utilized in, e.g., but not limited to, a mobile computing device such as a wearable device and/or a smartphone.

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

Some non-limiting Examples of various embodiments are provided below.

Example 1 is an apparatus for multi-level caching, the apparatus comprising: a first storage level to form a multi-level cache for a storage device, wherein the multi-level cache includes the first storage level and a second storage level, with the second storage level being a higher level than the first storage level. The first storage level of Example 1 includes: a memory; and a controller coupled to the memory. The controller is to: receive an input/output (I/O) request associated with a data; receive an indicator from the second storage level to indicate whether the data is stored or will be stored in the second storage level; and determine whether to store the data in the memory based on the indicator.

Example 2 is the apparatus of Example 1, wherein the controller is to receive the indicator in the I/O request associated with the data.

Example 3 is the apparatus of Example 1, wherein the indicator is received as part of differentiated storage services (DSS) information that further indicates a priority of the data.

Example 4 is the apparatus of Example 1, further comprising the second storage level coupled to the first storage level.

Example 5 is the apparatus of Example 1, wherein the I/O request is a write request, and the indicator indicates whether the data is stored in the second storage level.

Example 6 is the apparatus of Example 1, wherein the I/O request is a read request, and the indicator indicates whether the data will be stored in the second storage level.

Example 7 is the apparatus of Example 1, wherein the data is stored in the memory, and wherein the controller is further to evict the data from the memory if the indicator indicates that the data is stored or will be stored in the second storage level.

Example 8 is the apparatus of any one of Examples 1 to 7, wherein the memory of the first storage level is of a different memory technology than a memory of the second storage level.

Example 9 is the apparatus of Example 8, wherein the memory of the first storage level is a NAND solid state memory and the memory of the second storage level is a cross-point memory.

Example 10 is the apparatus of any one of Examples 1 to 7, wherein the multi-level cache further includes one or more additional storage levels including a third storage level disposed at a third level that is lower than the first level, wherein the second storage level is to pass the indicator to the third storage level and set a value of the indicator based on whether the data is stored or will be stored in the first storage level or the second storage level.

Example 11 is one or more non-transitory computer-readable media having instructions, stored thereon, that, when executed, cause a first storage level to: receive, from a second storage level, an input/output (I/O) request associated with a data; receive an indicator bit from the second storage level to indicate whether the data is stored or will be stored in the second storage level; and determine whether to store the data in the first storage level based on a value of the indicator bit.

Example 12 is the one or more media of Example 11, wherein the indicator bit is included in the I/O request.

Example 13 is the one or more media of Example 11, wherein the indicator bit is received as part of differentiated storage services (DSS) information that further indicates a priority of the data.

Example 14 is the one or more media of Example 11, wherein the I/O request is a write request.

Example 15 is the one or more media of Example 11, wherein the I/O request is a read request.

Example 16 is the one or more media of Example 11, wherein the instructions, when executed, further cause the first storage level to: determine whether the data is stored in the first storage level; and evict the data from the first storage level based on a determination that the data is stored in the first storage level and if the indicator bit indicates that the data is stored or will be stored in the second storage level.

Example 17 is the one or more media of any one of Examples 11 to 16, wherein a memory of the first storage level is of a different memory technology than a memory of the second storage level.

Example 18 is a system with multi-level caching capability, the system comprising: a processor; a storage device coupled to the processor; and a multi-level cache coupled to the processor and the storage device. The multi-level cache of Example 18 includes: an upper storage level; and a lower storage level coupled to the upper storage level, wherein the lower storage level is to: receive an input/output (I/O) request associated with a data, wherein the I/O request includes an indicator from the upper storage level to indicate whether the data is stored or will be stored in the upper storage level; and determine whether to store the data in the lower storage level based on the indicator.

Example 19 is the system of Example 18, wherein the indicator is received as part of differentiated storage services (DSS) information that further indicates a priority of the data.

Example 20 is the system of Example 18, wherein the I/O request is a write request, and wherein the indicator is to indicate whether the data is stored in the upper storage level.

Example 21 is the system of Example 18, wherein the I/O request is a read request, and wherein the indicator is to indicate whether the data will be stored in the upper storage level.

Example 22 is the system of Example 18, wherein the upper storage level, lower storage level, and storage device use different memory technologies.

Example 23 is the system of Example 18, wherein the storage device includes a network-attached storage.

Example 24 is the system of any one of Examples 18 to 23, wherein the system is a server.

Example 25 is the system of any one of Examples 18 to 23, wherein the system is a personal computer, laptop computer, tablet computer, or mobile computing device.

Example 26 is a caching method comprising: receiving, by a first storage level of a multi-level cache from a second storage level of the multi-level cache, an input/output (I/O) request associated with a data; receiving, by the first storage level, an indicator bit from the second storage level to indicate whether the data is stored or will be stored in the second storage level; and determining, by the first storage level, whether to store the data in the first storage level based on a value of the indicator bit.

Example 27 is the method of Example 26, wherein the indicator bit is included in the I/O request.

Example 28 is the method of Example 26, wherein the indicator bit is received as part of differentiated storage services (DSS) information that further indicates a priority of the data.

Example 29 is the method of Example 26, wherein the I/O request is a write request.

Example 30 is the method of Example 26, wherein the I/O request is a read request.

Example 31 is the method of Example 26, further comprising: determining whether the data is stored in the first storage level; and evicting the data from the first storage level based on a determination that the data is stored in the first storage level and if the indicator bit indicates that the data is stored or will be stored in the second storage level.

Example 32 is the method of any one of Examples 26 to 31, wherein a memory of the first storage level is of a different memory technology than a memory of the second storage level.

Example 33 is a cache apparatus comprising: a first storage level of a multi-level cache, the first storage level comprising: means to receive, from a second storage level of the multi-level cache, an input/output (I/O) request associated with a data; means to receive an indicator bit from the second storage level to indicate whether the data is stored or will be stored in the second storage level; and means to determine whether to store the data in the first storage level based on a value of the indicator bit.

Example 34 is the apparatus of Example 33, wherein the indicator bit is included in the I/O request.

Example 35 is the apparatus of Example 33, wherein the indicator bit is received as part of differentiated storage services (DSS) information that further indicates a priority of the data.

Example 36 is the apparatus of Example 33, wherein the I/O request is a write request.

Example 37 is the apparatus of Example 33, wherein the I/O request is a read request.

Example 38 is the apparatus of Example 33, wherein the first storage level further comprises: means to determine whether the data is stored in the first storage level; and means to evict the data from the first storage level based on a determination that the data is stored in the first storage level and if the indicator bit indicates that the data is stored or will be stored in the second storage level.

Example 39 is the apparatus of any one of Examples 33 to 38, wherein a memory of the first storage level is of a different memory technology than a memory of the second storage level.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements.

Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus comprising:
   a first storage level to form a multi-level cache with a second storage level for a storage device, wherein the second storage level is at a higher cache level than the first storage level, and wherein the first storage level includes:
      a non-volatile memory; and
      a controller circuit coupled to the non-volatile memory, the controller circuit to:
         receive an input/output (I/O) request associated with a data, wherein the I/O request includes an indicator to indicate whether or not the data is stored or will be stored in the second storage level or a storage level at a higher cache level than the second storage level, wherein the indicator is a first value to indicate that the data is not stored and will not be stored in the second storage level or the storage level at the higher cache level than the second storage level;
         determine that the data is to be stored in the non-volatile memory based on the indicator;
         modify the indicator, based on the determination that the data is to be stored in the non-volatile memory, to be a second value to indicate that the data is stored or will be stored in the first storage level or a storage level at a higher cache level than the first storage level; and
         pass the I/O request with the modified indicator to a third storage level that is at a lower cache level than the first storage level.

2. The apparatus of claim 1, wherein the indicator is received as part of differentiated storage services (DSS) information that further indicates a priority of the data.

3. The apparatus of claim 1, further comprising the second storage level coupled to the first storage level.

4. The apparatus of claim 1, wherein the I/O request is a write request, and the indicator in the received I/O request indicates whether the data is stored in the second storage level.

5. The apparatus of claim 1, wherein the I/O request is a read request, and the indicator in the received I/O request indicates whether the data will be stored in the second storage level.

6. The apparatus of claim 1, wherein the data is stored in the non-volatile memory, and wherein the controller circuit is further to evict the data from the non-volatile memory if the indicator in the received I/O request indicates that the data is stored or will be stored in the second storage level or the storage level at the higher cache level than the second storage level.

7. The apparatus of claim 1, wherein the non-volatile memory of the first storage level is of a different memory technology than a non-volatile memory of the second storage level.

8. The apparatus of claim 7, wherein the non-volatile memory of the first storage level is a NAND solid state memory and the non-volatile memory of the second storage level is a cross-point memory.

9. The apparatus of claim 1, wherein the indicator is a single bit.

10. One or more non-transitory computer-readable media having instructions, stored thereon, that, when executed, cause a first storage level of a multi-level cache to:
receive, from a second storage level of the multi-level cache, an input/output (I/O) request associated with a data, wherein the I/O request includes an indicator bit to indicate whether or not the data is stored or will be stored in the second storage level or a storage level at a higher cache level than the second storage level, wherein the indicator bit is a first value to indicate that the data is not stored and will not be stored in the second storage level or the storage level at the higher cache level than the second storage level;
determine that the data is to be stored in the first storage level based on a value of the indicator bit;
modify the indicator bit, based on the determination that the data is to be stored in the first storage level, to be a second value to indicate that the data is stored or will be stored in the first storage level or a storage level at a higher cache level than the first storage level; and
pass the I/O request with the modified indicator bit to a third storage level that is at a lower cache level than the first storage level.

11. The one or more media of claim 10, wherein the indicator bit is received as part of differentiated storage services (DSS) information that further indicates a priority of the data.

12. The one or more media of claim 10, wherein the I/O request is a write request.

13. The one or more media of claim 10, wherein the I/O request is a read request.

14. The one or more media of claim 10, wherein a non-volatile memory of the first storage level is of a different memory technology than a non-volatile memory of the second storage level.

15. A system comprising:
a processor;
a storage device coupled to the processor; and
a multi-level cache coupled to the processor and the storage device, wherein the multi-level cache includes:
an upper storage level; and
a lower storage level cache coupled to the upper storage level, wherein the lower storage level cache is to:
receive an input/output (I/O) request associated with a data, wherein the I/O request includes an indicator from the upper storage level to indicate whether or not the data is stored or will be stored in the upper storage level or another storage level higher than the upper storage level, wherein the indicator is a first value to indicate that the data is not stored and will not be stored in the upper storage level or the another storage level at the higher cache level than the upper storage level;
determine that the data is to be stored in the lower storage level based on the indicator;
modify the indicator, based on the determination that the data is to be stored in the lower storage level, to be a second value to indicate that the data is stored or will be stored in the lower storage level or a storage level at a higher cache level than the lower storage level; and
pass the I/O request with the modified indicator to another storage level that is at a lower cache level than the lower storage level.

16. The system of claim 15, wherein the indicator is received as part of differentiated storage services (DSS) information that further indicates a priority of the data.

17. The system of claim 15, wherein the I/O request is a write request, and wherein the received indicator is to indicate whether the data is stored in the upper storage level or the storage level higher than the upper storage level.

18. The system of claim 15, wherein the I/O request is a read request, and wherein the received indicator is to indicate whether the data will be stored in the upper storage level or the storage level higher than the upper storage level.

19. The system of claim 15, wherein the upper storage level, lower storage level, and storage device use different memory technologies.

20. The system of claim 15, wherein the storage device includes a network-attached storage.

21. The system of claim 15, wherein the system is a server.

22. The system of claim 15, wherein the system is a personal computer, laptop computer, tablet computer, or mobile computing device.

* * * * *